Figure 1:
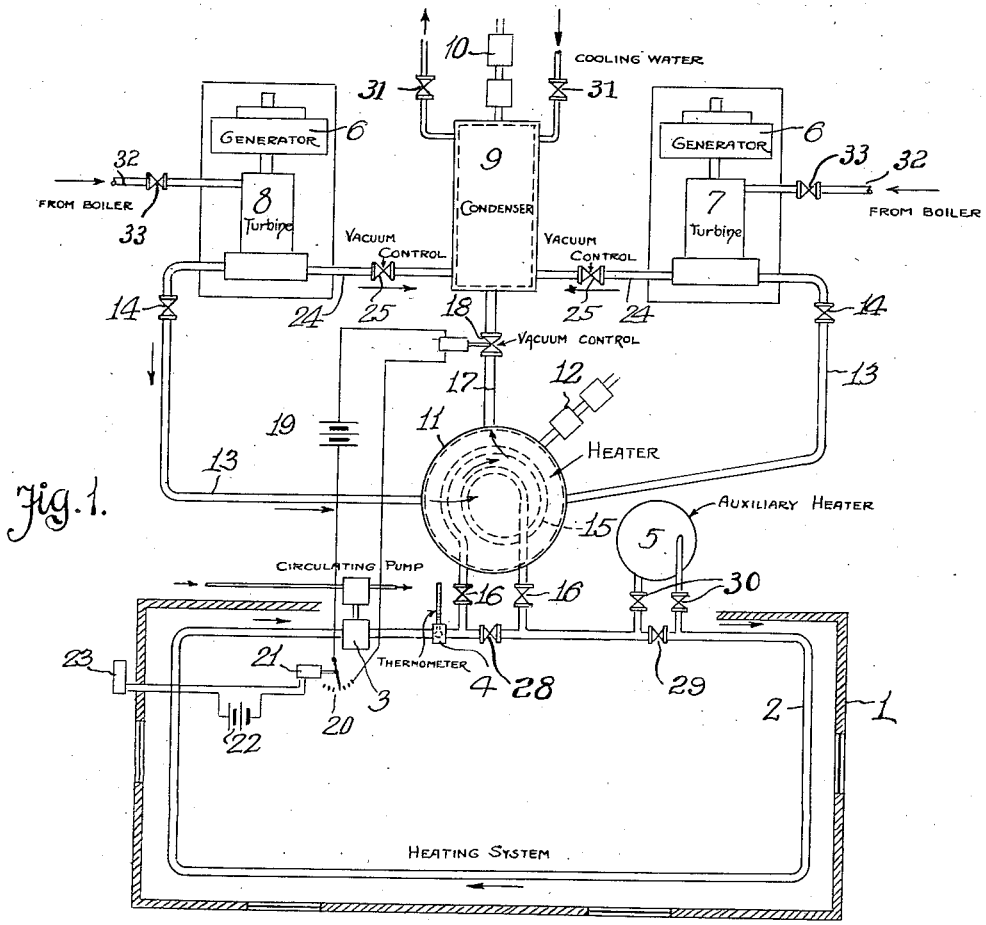

I. N. EVANS.
COMBINED HOT WATER HEATING AND CONDENSING POWER SYSTEM.
APPLICATION FILED MAY 4, 1918.

1,376,326. Patented Apr. 26, 1921.

Witness
Chas. W. Stauffiger
Karl H. Butler

Inventor
Ira N. Evans,
By Barthel & Barthel
Attorneys

UNITED STATES PATENT OFFICE.

IRA N. EVANS, OF DETROIT, MICHIGAN.

COMBINED HOT-WATER HEATING AND CONDENSING POWER SYSTEM.

1,376,326.

Specification of Letters Patent. Patented Apr. 26, 1921.

Application filed May 4, 1918. Serial No. 232,622.

*To all whom it may concern:*

Be it known that I, IRA N. EVANS, a citizen of the United States of America, residing at Detroit, in the county of Wayne and State of Michigan, have invented certain new and useful Improvements in Combined Hot-Water Heating and Condensing Power Systems, of which the following is a specification, reference being had therein to the accompanying drawings.

This invention relates to a combined hot water heating and condensing power system, and has special reference to a system that is applicable to any large industrial plant, office building or group of buildings where central power and heating are desirable and where the power unit or units are sufficiently large to warrant a condensing equipment that, in accordance with my invention, may be combined with a heating system of radiation with a forced hot water circulation.

My invention aims to provide a system wherein the cooling effects of a heating system may be utilized to condense the exhaust steam of a power plant, at pressures below atmosphere, thus producing a partial vacuum for the power plant, and furthermore, utilizing the exhaust steam of a power plant to heat the water of a forced hot water circulating system.

In generating steam for power purposes, about eighty per cent. of the heat is required to change the water into a vapor and the same heat, known as latent heat, has to be dissipated before the steam will revert back into water. Herein lies the economy in using the exhaust steam of the power plant as a source of heat for a heating system. The least expenditure of fuel that will give the highest pressure will be the most economical for the power plant, as the latent heat must be provided in all cases before the steam is in condition to be utilized for power. Also, the lowest pressure and temperature to which the steam is cooled will give the greatest economy in connection with the power generator. The most economical engine operation for power plants requires the latent heat from the exhaust to be dissipated and the steam condensed to produce vacuum, or the lowest absolute pressures, on the exhaust side of the engine; the power or heating requirements determining the variation of vacuum. It will therefore be readily seen that a heat distributing apparatus and a power plant may be made complementary devices by utilizing the cooling effect of the heat distributing plant to condense the exhaust steam from the power plant and thus produce a partial vacuum for the engines of the power plant.

The above is accomplished by either a manual or automatic control, preferably the latter, of a condenser heater forming part of a hot water heating system and into or through which the exhaust steam of the power plant may pass, so that the heat of the exhaust steam may be utilized for raising the temperature of the water in the heating system and produce pressures below atmosphere for the exhaust side of the power plant.

The above is furthermore accomplished by properly balancing the power plant or power generating system relative to a heat distributing system; it being necessary to consider the requirements of each and make provision for maintaining a desired temperature of the heating system by varying the quantity of heat of the entire apparatus to meet the outside varying temperature condition and obtain a constant power load from the generator, and also to provide for heating when the power system is out of commission.

My improved system will be better understood by reference to the drawing and it is to be understood that the system may be enlarged upon and that under certain conditions manual control of the same is preferable to automatic control.

Figure 2:
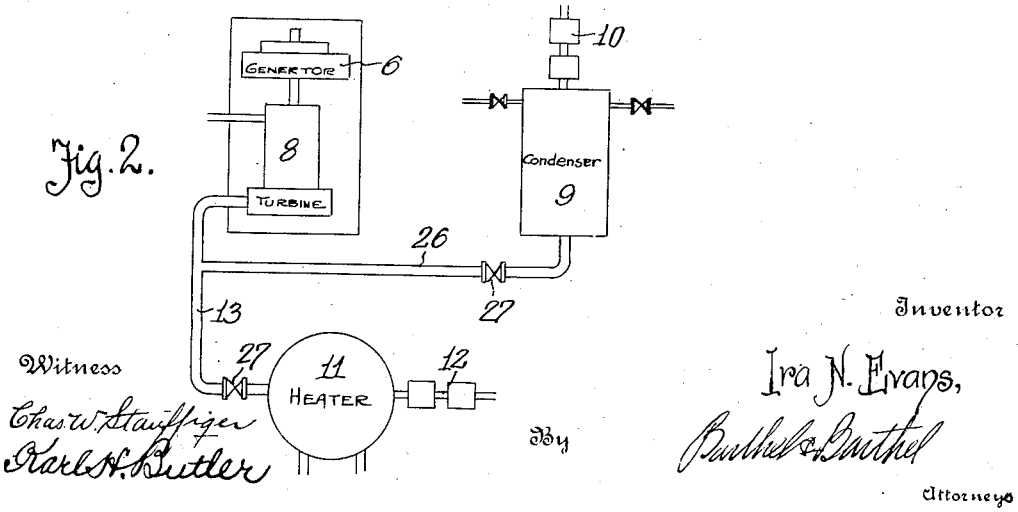

In the drawing,

Figure 1 is a diagrammatic view of combined power generating and heat distributing systems, and Fig. 2 is a diagrammatic view showing parallel instead of series steam connections for the apparatus.

In the drawing, the reference numeral 1 denotes the outline of a building or industrial plant provided with a heat distributing system 2 of the direct or indirect radiation type with forced hot water circulation, said system including a circulating pump 3, an indoor thermometer 4, a heater 5 (auxiliary) and such coils, radiators, conduits and controlling valves as are essential for maintaining a hot water heating system in operation.

Either in, or contiguous to, the building or plant 1 is a power plant for generating power, and the plant has been illustrated as including power generators 6, steam operated turbines or engines 7 and 8 for said power generators, said turbines having steam supply pipes 32 and shut off valves 33, and a main condenser 9, said condenser being essential in order to produce a partial vacuum on the exhaust side of the steam operated turbines 7 and 8. Associated with the condenser 9 is a condensate pump 10 and valves 31 for controlling the injection of water from a cooling tower or pond.

Associated with both systems is a condenser heater 11 which may be in the form of a closed feed water heater, condenser or suitable receptacle connected to a condensate pump 12. The condenser heater is also connected to the steam exhaust pipes 13 of the turbines 7 and 8, said pipes having suitable shut off valves 14 so that said turbines may be operated together or one may be operated independent of the other on different vacuums.

Within the condenser heater 11 is a coil or conduit 15 connected to the heat distributing system 2 with valves 16 adjacent the condenser heater, so that the coil 15 may be rendered inoperative for the purpose for which it is intended. Valves 28 and 29 are made part of the system 2 and valves 30 are included in the connections between the system 2 and the auxiliary heater 5. When valves 16 are closed, for instance, for repair purposes, then the valves 28 and 30 are open so the auxiliary heater 5 may be used, with the valve 29 closed, otherwise said valve is open. As shown, however, the coil or conduit 15 constitutes means in connection with the contents of the condenser heater, for heating the water in the system 2, and constitutes a main heater, when compared with the auxiliary heater 5, as said auxiliary heater is only brought into action when there is no power load and the turbines are inactive.

The condenser heater 11 is connected to the main condenser 9 by a pipe 17 provided with an electrically operated valve 18, said valve being adjustable to regulate the communication between the condenser 9 and the condenser heater 11. The electrically operated valve 18 is of a conventional form and is in circuit with a suitable source of electrical energy 19 and a rheostat 20, said rheostat being actuated by a solenoid 21 in circuit with a suitable source of electrical energy 22 and a thermostat 23. The elements 20 to 23 inclusive are of a conventional form associated with the hot water heating system, and the degree of heat provided by said system is regulated according to atmospheric conditions outside of the building or plant 1.

The electrically operated valve 18 may be hand operated and constitutes adjustable means for controlling the exhaust from the condenser heater and more particularly the velocity and temperature of exhaust steam passing through said condenser heater.

Assuming that the circulating pump 3 maintains a supply and circulation of water for the heating system 2 and that the valves 16 are open, the water circulated through the coil 15 will be heated by the steam exhausting into the condenser heater 11 from either or both turbines 7 and 8. The opening or closing of the valve 18 varies the pressure of steam in the condenser heater and the absolute pressure established in connection with the turbines 7 and 8 determines their steam power rate, said partial vacuum being essential for the economical operation of the turbines, as set forth in the beginning, and it thereby governs the momentary requirements of the condenser heater in heat as to temperature and amount.

When the heating system is not needed the valves 14 and 18 are closed and the turbines exhaust through pipes 24 to the condenser 9, said pipes having valves 25 which are open in the summer and closed during the winter. The valves 14 and 25 permit of one or the other of the turbines being used with either the main condenser 9 or the condenser heater 11, and it is possible to adjust valve 18 so as to properly balance the power generating system relative to the heating system. This, however, can be taken care of by the size of the condenser 9 and the coil 15 in the condenser heater, the size of the latter depending on the heating system and the size of the former on the work performed by the power generating system. These coöperating devices having been properly balanced, it is then possible to depend on the outside thermostat to regulate the degree of heat to be produced by the heating system within the building 1, and should such automatic control not be satisfactory, as determined by the indoor thermometer 4, then the valve 18 may be manually adjusted to either increase or decrease the velocity and pressure of exhaust steam through the condenser heat 11. It is obvious that the greater the absolute pressure and temperature of steam in the heater 11 the greater the amount of heat for the coil 15, and with the valve 18 wide open the temperature and pressure of the exhaust from the turbines 7 and 8 will be the same as the condenser at the minimum absolute pressure or full vacuum.

In Fig. 2 there is illustrated a slight modification of my invention, wherein the condenser is connected to the pipe 13 by a pipe 26 and both of said pipes provided with controlling valves 27, the valve of the pipe 26 being similar to the valve 18, thus permitting the turbine to exhaust into the condenser 9 or into the heater 11. This illustrates the use of a single turbine with the pipe 26 connected to the pipe 13 so that the condenser 9 and the condenser heater 11 may coöperate in producing a partial vacuum for the turbine.

I attach considerable importance to the fact that the velocity, absolute pressure and temperature of the exhaust steam from the power generating system is regulated by varying the outlet of a condenser heater associated with a hot water heating system, and with the outlet of the exhaust steam thermostatically controlled it is possible to regulate the degree of heat expected from the heating system and the degree of partial vacuum essential for the power generating system. In using the term "power generator," I desire it to be understood that it includes any turbine, engine, prime mover, or work performing element having an exhaust carrying heat, and the "hot water circulating and heating apparatus" represents any heat absorbing agent that may derive its heat from the exhaust of the power generator.

What I claim is:—

The combination of a power generator having an exhaust, a condenser, a connection between said condenser and the exhaust of said power generator, a condenser heater; connections establishing communication between said condenser heater, said condenser and the exhaust of said power generator; a hot water circulating and heating apparatus having a portion thereof in said condenser heater to simultaneously reduce the pressure of steam exhausting into the condenser heater and cause the water in said heating apparatus to be heated, and means in the connection between said condenser heater and said condenser to vary the exhaust of said condenser heater into said condenser.

In testimony whereof I affix my signature in the presence of two witnesses.

IRA N. EVANS.

Witnesses:
ANNA M. DORR,
KARL H. BUTLER.